United States Patent
Wakeford et al.

(10) Patent No.: US 10,456,664 B2
(45) Date of Patent: *Oct. 29, 2019

(54) DYNAMICALLY ADJUSTING VIRTUAL ITEM BUNDLES AVAILABLE FOR PURCHASE BASED ON USER GAMEPLAY INFORMATION

(71) Applicant: Kabam, Inc., San Francisco, CA (US)

(72) Inventors: Kent Wakeford, Hillsborough, CA (US); Clifford J. Harrington, San Francisco, CA (US); Matthew Curtis, Novato, CA (US); James Koh, Mountain View, CA (US); Kellen Christopher Smalley, Pleasanton, CA (US); Michael C. Caldarone, Palo Alto, CA (US)

(73) Assignee: Kabam, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,970

(22) Filed: Apr. 25, 2018

(65) Prior Publication Data

US 2018/0236351 A1 Aug. 23, 2018

Related U.S. Application Data

(63) Continuation of application No. 15/783,459, filed on Oct. 13, 2017, which is a continuation of application No. 13/870,793, filed on Apr. 25, 2013, now Pat. No. 9,808,708.

(51) Int. Cl.
| | | |
|---|---|---|
| *A63F 13/00* | (2014.01) | |
| *A63F 13/35* | (2014.01) | |
| *A63F 13/69* | (2014.01) | |
| *A63F 13/792* | (2014.01) | |

(52) U.S. Cl.
CPC .............. *A63F 13/00* (2013.01); *A63F 13/35* (2014.09); *A63F 13/69* (2014.09); *A63F 13/792* (2014.09)

(58) Field of Classification Search
CPC .......... A63F 13/12; A63F 13/35; A63F 13/69; A63F 2300/55; A63F 2300/5546; A63F 2300/5566; A63F 2300/558
See application file for complete search history.

(56) References Cited

U.S. PATENT DOCUMENTS

| | | | |
|---|---|---|---|
| 6,634,949 B1 * | 10/2003 | Briggs | A63F 13/12 273/440 |
| 2005/0182693 A1 | 8/2005 | Alivandi | |
| 2006/0121992 A1 * | 6/2006 | Bortnik | G07F 17/32 463/43 |
| 2006/0247055 A1 * | 11/2006 | O'Kelley, II | A63F 13/12 463/42 |
| 2007/0087834 A1 | 4/2007 | Moser | |
| 2008/0032787 A1 | 2/2008 | Low | |

(Continued)

*Primary Examiner* — James S. McClellan
*Assistant Examiner* — Kevin M Carter
(74) *Attorney, Agent, or Firm* — Esplin & Associates, PC

(57) ABSTRACT

This disclosure relates to adjusting virtual item bundles made available to users of on online game based on user gameplay information. In implementations, information relating to prospective usage of the online game is used to classify users according by user type. Responsive to the determined user type of a user, customizations of item bundles in the online game made available to individual users for purchase within the online game may be determined.

17 Claims, 3 Drawing Sheets

(56) References Cited

U.S. PATENT DOCUMENTS

| | | |
|---|---|---|
| 2008/0098417 A1 | 4/2008 | Hatamian |
| 2009/0075738 A1* | 3/2009 | Pearce .................... G07F 17/32 |
| | | 463/42 |
| 2009/0131152 A1 | 5/2009 | Busse |
| 2009/0210301 A1 | 8/2009 | Porter |
| 2010/0050088 A1 | 2/2010 | Neustaedter |
| 2010/0094841 A1 | 4/2010 | Bardwil |
| 2011/0014972 A1 | 1/2011 | Herrmann |
| 2011/0045912 A1 | 2/2011 | Bortnik |
| 2011/0092273 A1 | 4/2011 | Cerbini |
| 2011/0113353 A1 | 5/2011 | Koh |
| 2011/0145040 A1 | 6/2011 | Zahn |
| 2011/0275431 A1 | 11/2011 | Hirzel |
| 2012/0042282 A1 | 2/2012 | Wong |
| 2012/0069131 A1 | 3/2012 | Abelow |
| 2012/0101886 A1* | 4/2012 | Subramanian ..... G06Q 30/0222 |
| | | 705/14.23 |
| 2012/0142429 A1* | 6/2012 | Muller .................... A63F 13/45 |
| | | 463/42 |
| 2012/0178529 A1 | 7/2012 | Collard |
| 2012/0197874 A1 | 8/2012 | Zatkin |
| 2012/0264509 A1 | 10/2012 | Bortnik |
| 2013/0116032 A1 | 5/2013 | Lutnick |
| 2013/0190094 A1 | 7/2013 | Ronen |
| 2013/0226733 A1* | 8/2013 | Evans .................... G06Q 30/06 |
| | | 705/26.25 |
| 2013/0303288 A1* | 11/2013 | McCoy ............... G07F 17/3227 |
| | | 463/42 |
| 2014/0038716 A1* | 2/2014 | Endo ........................ A63F 13/12 |
| | | 463/31 |
| 2014/0122702 A1* | 5/2014 | Jung .................. H04L 43/0876 |
| | | 709/224 |

* cited by examiner

DYNAMICALLY ADJUSTING VIRTUAL ITEM BUNDLES AVAILABLE FOR PURCHASE BASED ON USER GAMEPLAY INFORMATION

FIELD OF THE DISCLOSURE

This disclosure relates to adjusting virtual item bundles made available to users of an online game, in which virtual item bundles are made available to users based on obtained user gameplay information.

BACKGROUND

It is known that within online games, users tend to participate in various aspects of the game and eschew others. These aspects include, for example, a collection/harvesting mechanic in which resources are collected, cultivated, manufactured, etc. Another aspect includes Player versus Player ("PvP") gameplay in which users seek to engage in compete directly with other players within the game (e.g., battling). Yet another aspect includes Player versus Environment ("PvE") gameplay in which users seek to complete "quests" or other tasks within the game to gain points, virtual items, and/or other rewards.

However, in conventional online games, bundles of virtual items and/or pricing of the bundles of virtual items are uniform among all users. Conventional bundling of virtual items does not distinguish what types of virtual items a particular user desires to access, is willing to pay for, and/or will maintain user's desire to access the online game.

Accordingly, alternative approaches regarding customization of virtual item bundles may enhance users' gameplay experience.

SUMMARY

One aspect of this disclosure relates to a system for adjusting virtual item bundles made available to users of an online game. In some implementations, the system may include one or more servers. The server(s) may be configured to communicate with one or more client computing platforms according to a client/server architecture. The users may access the system via the client computing platforms, for instance, to engage in one or more games.

In implementations, the server(s) may include one or more processors configured to execute computer program modules. The computing modules may include a game module, a user information module, a user type module, and an item bundle customization module.

The game module may be configured to execute an instance of the online game to facilitate presentation of the online game to the users of the online game. The game module may also be configured to implement in-game actions in the instance of the online game in response to action requests for the in-game actions form the users, including in-game action requests from a first user.

The user information module may be configured to obtain user gameplay information related to prospective usage of the online game by the users. In implementations, the user gameplay information may include a first set of user gameplay information related to prospective usage of the online game by the first user.

The user type module may be configured to determine user types of users based on obtained user gameplay information. The user type module may be configured determine a first user type for the first user based on the first set of user gameplay information.

The item bundle customization module may be configured to determine customizations of item bundles in the online game made available to individual users for purchase within the online game based on the user types. In implementations, the customizations may be configured to expand the usage of the online game by the users. The customizations may include a first customization of item bundles made available to the first user to expand usage of the online game by the first user. In implementations, the first customization may be determined based on the first user type for the first user.

In implementations, the game module may be further configured to implement the customizations determined for the individual users, such that the first customization is implemented in the instance of the online game for the first user.

In implementations, the user types include at least one of a collection and harvesting type, preferring at least one of resource collection, resource cultivation and resource manufacturing, a player versus player type, preferring competing with other users within the online game, a player versus environment type preferring completing quests, and/or other user types.

In implementations, the user information module may be further configured to monitor the users' usage of the online game.

In implementations, the first set of user gameplay information includes online game usage information associated with other users associated with the first user.

In implementations, the first set of user gameplay information includes at least one of the first user's usage of other online games and other users' usage of the online game, wherein the other users are associated with the first user.

In implementations, the first set of user gameplay information includes at least one of specific in-game actions and in-game action types performed most frequently by the first user within the instance of the online game.

In implementations, the customization of item bundles in the online game made available to the individual users affects at least one of which items are grouped together into bundles and prices of the item bundles.

In implementations, the customizations of item bundles has the effect of reducing costs to users of purchasing items associated with user types other than the users' own.

In implementations, the customizations of item bundles in the online game made available to the individual users includes at least one of re-ordering pre-existing item bundles in an in-game store, filling open slots in pre-formed item bundles, and creating new item bundles by selection of all items included therein.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural references unless the context clearly dictates otherwise.

DETAILED DESCRIPTION

Figure 1:
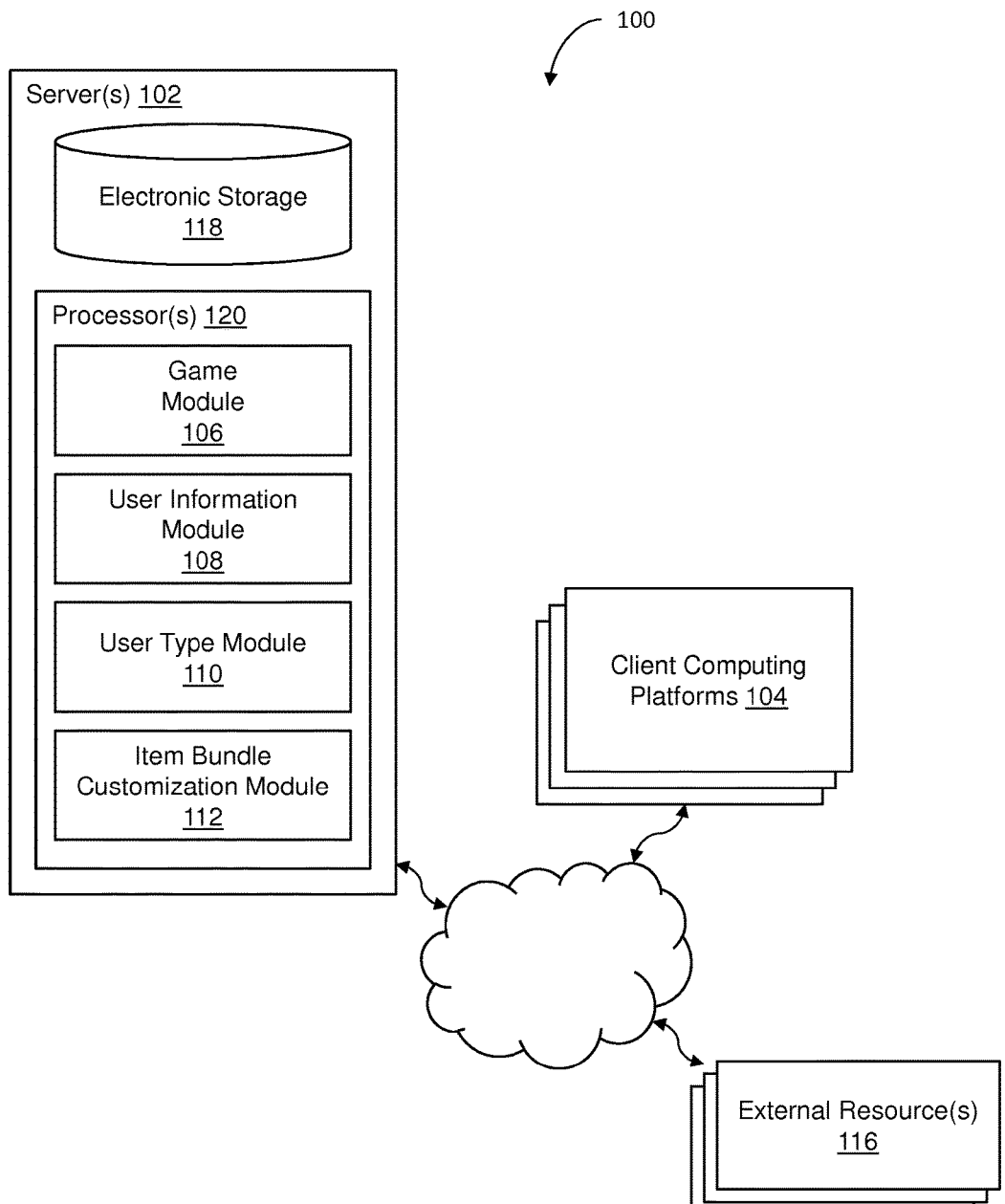
FIG. 1 illustrates a system for adjusting virtual item bundles made available to users of an online game, in accordance with one or more implementations.

FIG. 1 illustrates a system 100 configured to provide a virtual space. System 100 is only one example of a suitable computing environment and is not intended to suggest any limitation as to the scope of use or functionality of the features described herein. Providing the virtual space may include hosting the virtual space over a network. In this disclosure, aspects of an online game that a user most enjoys may be identified, and virtual item bundles presented to the user may be adjusted based on the gameplay the user enjoys. Accordingly, embodiments may be configured for customization of virtual item bundles that may result in a virtual online game providing more engaging and immersive in-game experiences for users.

In some implementations, system 100 may include one or more servers 102. The server 102 may be configured to communicate with one or more client computing platforms 104 according to a client/server architecture. The users may access system 100 and/or the virtual space via client computing platforms 104, for instance, to engage in one or more games.

The server(s) 102 may be configured to execute one or more computer program modules. The computer program modules may include one or more of a game module 106, a user information module 108, a user type module 110, and an item bundle customization module 112, and/or other modules. As noted, the client computing platform(s) 104 may include one or more computer program modules that are the same as or similar to the computer program modules of the server(s) 102 to facilitate in-game actions.

The game module 106 may be configured to execute an instance of a game to facilitate presentation of the game to users. The game module 106 may be configured to implement in-game actions in the instance of the game, in response to action requests for the in-game actions by the users.

The game may be provided via a virtual space, and may include a plurality of resource types and/or maps. An instance of the virtual space may be executed by computer modules to determine views of the virtual space. The views may then be communicated (e.g., via streaming, via object/position data, and/or other information) from server(s) 102 and/or sources to client computing platforms 104 for presentation to users. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated.

User-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user-controlled element) and/or other items, to perform in-game actions within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102. In implementations, game module 106 may also be configured to implement customizations of item bundles for individual users of the online game in the instance of the online game for the individual user.

The user information module 108 may be configured to obtain user gameplay information related to prospective usage of the online game by the users. In implementations, user information module 108 may be further configured to monitor the users' usage of the online game. User gameplay information may include information about the users that has some value in predicting their preferred styles of gameplay, for example demographic and geographic information, gender information, device type, interests, activity in other online games, and information about other users that are associated users, in addition to in-game actions taken by the users in the online game. Such gameplay information may be obtained directly from the users, for example using pop-ups and/or other graphical interfaces, automatically from users' social network or other profiles, from IP addresses, cookies, etc. In implementations, the user information obtained by user information module 108 may include online game usage information associated with other users associated with a first user of the online game. The other users may be associated with the first user on an online social network. For example, the other users and the first users may be associated via relationships, affiliations, connections, etc. on a blogging service provided by Twitter™, a social network provided by Facebook™, the social network provided by MySpace™, a social network provided by Foursquare®, a file sharing service provided by Flickr®, Blogger, YouTube, PlayStation® Home, Xbox® Live, and/or other interactive electronic social media.

The user type module 110 may be configured to determine user types of users based on obtained user gameplay information. The user types may include at least one of the following: 1) a collection or harvesting type, preferring at least one of resource collection, resource cultivation and resource manufacturing; 2) a player versus player type, preferring competing with other users within the online game; 3) a player versus environment type preferring completing quests, and/or other user types. User type determinations may be made based at least in part on the frequency with which users perform certain in-game actions or types of in-game actions. For example, in implementations certain in-game actions may be classified as corresponding to certain user types, e.g. resource harvesting in-game actions correspond to a collection or harvesting type, player battling in-game actions correspond to a player versus player type, etc. User types may then be determined based on the frequency with which users perform these various types of in-game actions. In implementations, the user type module 110 may also be configured to determine the user type of the first user in response to the first user's user type in other online games. For example, if the first user has the same user type in a plurality of other online games, user type module 110 may determine that the first user may have the same user type for the online game. In implementations, user type module 110 may also be configured to determine the user type of the first user based on the gameplay information of other users associated with first user. For example, the user type of the first user may be based on the user type(s) of the other users associated with the first user.

The item bundle customization module 112 may be configured to determine customizations of item bundles in the online game made available to individual users for purchase within the online game based on the user types. The item bundles may be comprised of various items that the user may use in the game. The items within an item bundle may in implementations assist users in carrying out various in-game actions. The items may for example increase or decrease for users and/or user-controlled elements: the speed and/or frequency with which various in-game actions may be performed, the quantity and/or quality of resources gathered and/or manufactured, the number of skills/abilities/spells and associated actions available, various attributes such as health/stamina, magic/mana, etc., combat abilities and capabilities, speed of movement and available map areas, etc. In implementations, the items may be represented as virtual goods such as virtual clothing (e.g. footwear, headware, armor), virtual tools such as weapons, manufacturing or agricultural implements, etc., accessories such as talismans, amulets, rings, pins, knick-knacks, and even vehicles or mounts. The customizations may derive from sets of user gameplay information and are designed to enhance item bundles presented to the users of the online game. Determination of these customizations may be based on the user gameplay information obtained for example via the monitoring of users and others the users have relationships with (e.g., in a social network and/or within the online game). Moreover, customizations of item bundles may be performed on a reactionary basis, based on previous actions and gameplay by a user, and/or using a predictive algorithm that anticipates how a user will want to play a game based on information known about that user, such as demographic information, geographic information and/or device type, etc.

The customizations of the item bundles may be configured to affect the users' usage of different aspects of the online game and/or to adjust prices of item bundles. The first customization may be determined based on the user type for the first user. In implementations, the customizations of item bundles in the online game made available to the individual users may affect which items are grouped together into bundles and/or the prices of the item bundles within a virtual online store associated with the online game. Thus, for example, in implementations a user identified as preferring resource collection may be presented with item bundles with items associated with resource-collecting powers, abilities, skills and/or downloadable content, which may not be available or may be less available to other types of users. For example, an item bundle available to such a user may be reduced or increased in cost and/or include more or less powerful items for resource collection than item bundles made available to users identified as preferring player versus player or player versus environment activity. Such customizations may improve gameplay for the user, and may encourage the user to experience different aspects of the online game, and/or to be encouraged by progress within a preferred aspect of the game and to continue and/or increase gameplay.

In some implementations, items within an item bundle that are useful or more useful for other aspects of gameplay that the user is identified as being less interested in may be presented to the user within an item bundle. For example, an item bundle presented to the user may include powerful items that are useful for other aspects of the gameplay other than the game type that the user is identified as being most interested i. Further, the customization of item bundles may effectively reduce or increase the cost to users of purchasing items associated with user types other than the users' own. For example, item bundles including items that are useful for other aspects of the gameplay other than the game aspect(s) that the user is identified as being most interested in may be presented to the user at a reduced cost within a virtual store associated with the online game. Accordingly, users may be provided with incentives to compete in and perhaps enjoy other aspects of the game without investing more time or monetary resources than desired.

The customization of item bundles in the online game made available to the individual users may also include re-ordering the presentation of pre-existing item bundles in the in-game store, filling open slots in pre-formed item bundles, increasing the number of items within an item bundle, and/or creating new item bundles by selecting all items included therein. For example, if it is determined that a user has a first user type, item bundles associated with the first user type may be prominently presented to the user, while item bundles associated with other user types may be less prominently presented to the user. In other implementations, an item bundle may include a plurality of pre-determined items slots with items that remain the same for all users of the online game and one or more customized item slot(s) with items that are adjusted dynamically based on the user type of the user.

A given client computing platform 104 may include one or more processors configured to execute computer program modules. The computer program modules may be configured to enable an expert or user associated with the given client computing platform 104 to interface with system 100 and/or external resources 116, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 116 may include sources of information, hosts and/or providers of virtual environments outside of system 100, external entities participating with system 100, and/or other resources. In some implementations, some or all of the functionality attributed herein to external resources 116 may be provided by resources included in system 100.

Server 102 may include electronic storage 118, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 118 may comprise non-transitory storage media that electronically stores information. The electronic storage media of electronic storage 118 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute modules 106, 108, 110, and 112. Processor 120 may be configured to execute modules 106, 108, 110, and 112 by software; hardware; firmware; some combination of software, hardware, and/or firmware; and/or other mechanisms for configuring processing capabilities on processor 120. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112 are illustrated in FIG. 1 as being implemented within a single processing unit, in implementations in which processor 120 includes multiple processing units, one or more of modules 106, 108, 110, and 112 may be implemented remotely from the other modules. The description of the functionality provided by the different modules 106, 108, 110, and 112 described below is for illustrative purposes, and is not intended to be limiting, as any of modules 106, 108, 110, and 112 may provide more or less functionality than is described. For example, one or more of modules 106, 108, 110, and 112 may be eliminated, and some or all of its functionality may be provided by other ones of modules 106, 108, 110, and 112. As another example, processor 120 may be configured to execute one or more additional modules that may perform some or all of the functionality attributed below to one of modules 106, 108, 110, and 112.

Figure 2:
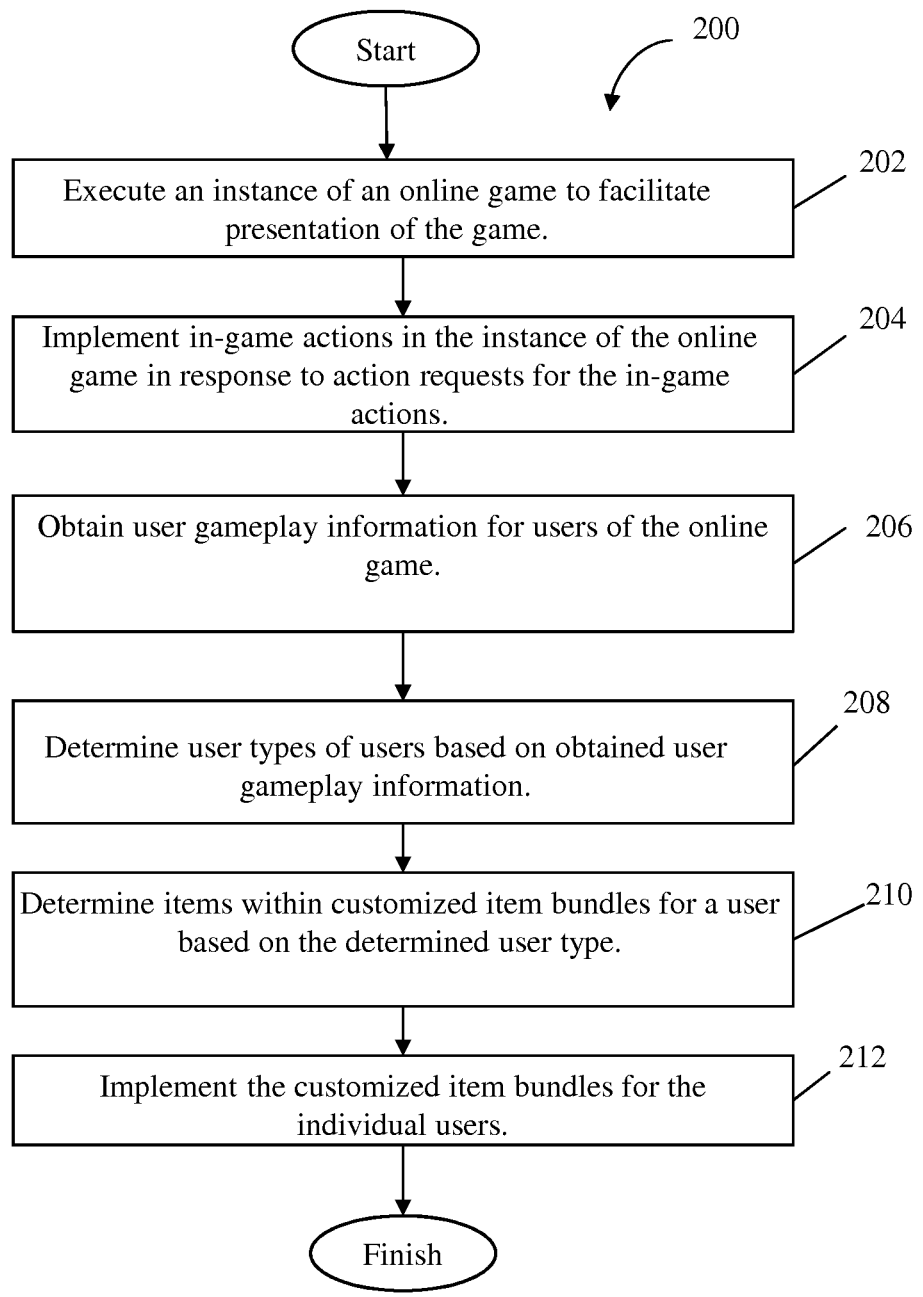
FIG. 2 illustrates a method for adjusting virtual item bundles made available to users of an online game, in accordance with one or more implementations.

FIG. 2 illustrates a method 200 for adjusting items within virtual item bundles made available to users of an online game. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of an online game may be executed to facilitate presentation of the game to users. The game, for instance, may include parameters including a size and/or type of virtual space the game will be played on, the number of players, resource types, user-controlled elements, and/or buildings initially allocated to users. Operation 202 may be performed by a game module that is the same as or similar to game module 106, in accordance with one or more implementations.

At an operation 204, in-game actions may be implemented in the instance of the game in response to action requests for in-game actions by the users. In implementations, the in-game actions may include collecting, harvesting, and/or manufacturing resources, player versus player competitions including battles and skills competitions, and player versus environment interactions including map exploration and quest completion. Operation 204 may be performed by a game module that is the same or similar to game module 106, in accordance with one or more implementations.

At an operation 206, user gameplay information may be obtained that relates to prospective usage of the online game. The user gameplay information may include a first set of user gameplay information related to prospective usage of the online game by the first user. In implementations, the first set of user gameplay information may include online game usage information associated with the first user, online game usage information associated with other users associated with the first user, and/or the first user's usage of other online games. User gameplay information may include past behavior (online game usage) by users within the online game and/or other information known about the users, such as demographic information, geographic information, gameplay of friends, etc. User gameplay information may comprise any information that may be used to determine a user's preferred style of gameplay going forward. Additionally, the user gameplay information may include at least one of specific in-game actions performed most frequently by the users in the online game and in-game action types performed most frequently by the users in the online game. Operation 206 may be performed by a user information module that is the same or similar to user information module 108, in accordance with one or more implementations.

At operation 208, user types are determined based on obtained user gameplay information. A first user type may be determined for the first user based on the first set of user gameplay information. The user types may include at least one of a collection and harvesting type, a player versus player type, a player versus environment type, and/or other user types. User types may be determined based on the gameplay information including the frequency with which a user has performed specific in-game actions or types of in-game actions, the user's usage of other online games, and/or based on the user types of other users associated with the user on an online network. Determination of user types may be performed on a reactionary basis, based on previous actions and gameplay of users, and/or using a predictive algorithm that anticipates how users will want to play a game based on information known about the users, such as demographic information, geographic information and/or device type, etc. Operation 208 may be performed by a user type module that is the same as or similar to user type module 110, in accordance with one or more implementations.

At operation 210, user gameplay information may be used to determine the customization of items within an item bundle in the online game available to individual users. In implementations, the items within an item bundle may be based on the individual users' user types. In implementations the items within an item bundle may be downloadable content for the game, and/or may assist users in carrying out various in-game actions. The items may for example increase or decrease for users and/or user-controlled elements: the speed and/or frequency with which various in-game actions may be performed, the quantity and/or quality of resources gathered and/or manufactured, the number of skills/abilities/spells and associated actions available, various attributes such as health/stamina, magic/mana, etc., combat abilities and capabilities, speed of movement and available map areas, etc. In implementations, the items may be represented as virtual goods such as virtual clothing (e.g. footwear, headware, armor), virtual tools such as weapons, manufacturing or agricultural implements, etc., accessories such as talismans, amulets, rings, pins, knick-knacks, and even vehicles or mounts. Operation 210 may be performed by a user type module that is the same as or similar to item bundle customization module 112, in accordance with one or more implementations.

At operation 212, the customized item bundles for the individual users of the online game may be implemented and presented to the users. For example, items within an item bundle may be customized for a first user and presented to the first user in the online game. The order in which item bundles are presented may be adjusted based on the user types of the users. The first user may view the items within the item bundle and/or purchase the item bundle within a virtual store using virtual currency or real currency. Operation 212 may be performed by a game module that is the same as or similar to the game module 106, in accordance with one or more implementations.

Figure 3:
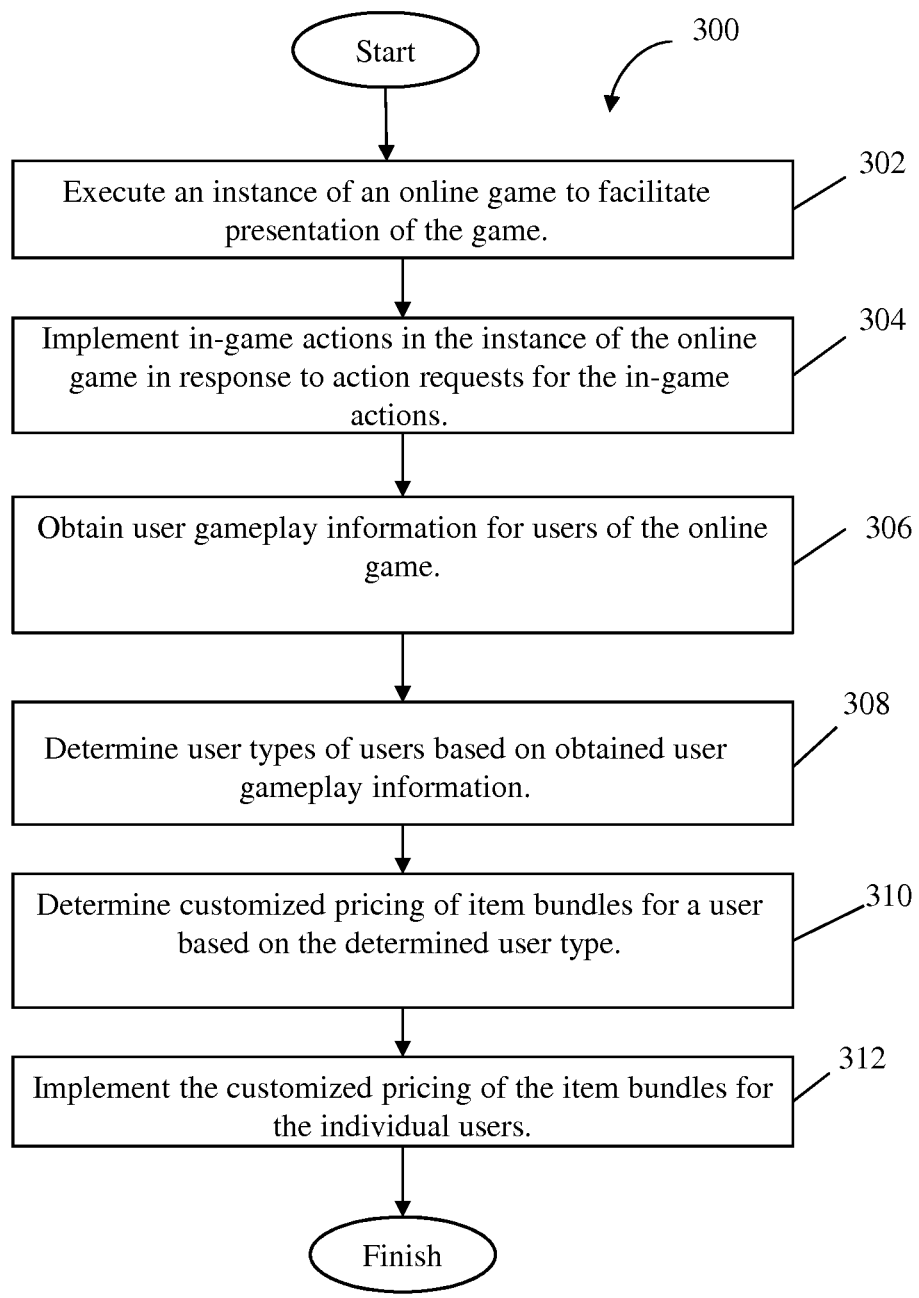
FIG. 3 illustrates a method for implementing customization of item bundles made available to users of an online game by monitoring the user gameplay information of a plurality of users, in accordance with one or more implementations.

FIG. 3 illustrates a method for implementing customized pricing of item bundles made available to a first user of an online game, in accordance with one or more implementations. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of an online game may be executed to facilitate presentation of the game to users. The game, for instance, may include parameters including a size and/or type of virtual space the game will be played on, the number of players, resource types, user-controlled elements, and/or buildings initially allocated to users. Operation 302 may be performed by a game module that is the same as or similar to game module 106, in accordance with one or more implementations.

At an operation 304, in-game actions may be implemented in the instance of the game in response to action requests for in-game actions by the users. In implementations, the in-game actions may include collecting, harvesting, and/or manufacturing resources, player versus player competitions including battles and skills competitions, and player versus environment interactions including map exploration and quest completion. Operation 304 may be performed by a game module that is the same or similar to game module 106, in accordance with one or more implementations.

At an operation 306, user gameplay information may be obtained that relates to prospective usage of the online game. The user gameplay information may include a first set of user gameplay information related to prospective usage of the online game by the first user. In implementations, the set of first user gameplay information may include online game usage information associated with the first user, online game usage information associated with other users associated with the first user, and/or the first user's usage of other online games. User gameplay information may include past behavior (online game usage) by users within the online game and/or other information known about the users, such as demographic information, geographic information, gameplay of friends, etc. User gameplay information may comprise any information that may be used to determine a user's preferred style of gameplay going forward. Additionally, the first set of user gameplay information may include at least one of specific in-game actions performed most frequently by the first user in the online game and in-game action types performed most frequently by the first user in the online game. Operation 306 may be performed by a user information module that is the same or similar to user information module 108, in accordance with one or more implementations.

At operation 308, user types are determined based on obtained user gameplay information. A first user type may be determined for the first user based on the first set of user gameplay information. The user types may include at least one of a collection and harvesting type, a player versus player type, a player versus environment type, and/or other user types. User types may be determined based on the obtained gameplay information, including the frequency with which a user has performed specific in-game actions or types of in-game actions, the user's usage of other online games, and/or based on the user types of other users associated with the user on an online network. Determination of user types may be performed on a reactionary basis, based on previous actions and gameplay of users, and/or using a predictive algorithm that anticipates how users will want to play a game based on information known about the users, such as demographic information, geographic information and/or device type, etc. Operation 308 may be performed by a user type module that is the same as or similar to user type module 110, in accordance with one or more implementations.

At operation 310, user gameplay information may be used to determine pricing of an item bundle in the online game available to individual users. In implementations, the pricing of an item bundle may be based on an individual user's user type. The pricing of the item bundles may be increased or decreased based on the user type of a prospective user purchaser of the item bundle and/or a user type associated with the item bundle. An item bundle including items associated with a first user type may increase in price for a user with the first user type because the user may have less cost sensitivity associated with activities that the user enjoys. In other implementations, an item bundle including items associated with the first user type may decrease in price for the user with the first user type encourage or reward the user's continued usage of the online game. In implementations, an item bundle including items associated with the first user type may decrease in price for a user having a second user type to provide an incentive for the user to participate in different aspects of the online game. Operation 310 may be performed by a user type module that is the same as or similar to item bundle customization module 112, in accordance with one or more implementations.

At operation 312, the item bundles with customized pricing for the individual users of the online game may be implemented and presented to the user. For example, item bundle prices may be customized for a first user and presented to the first user in the online game. The first user may view the customized pricing of the item bundles and purchase the item bundles within a virtual store using virtual currency or real currency. Operation 312 may be performed by a game module that is the same as or similar to the game module 106, in accordance with one or more implementations. Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for offering item bundles for purchase to users of an online game, wherein the offered item bundles are customized to encourage one or more types of usage of the online game by the users, the system comprising:

one or more physical processors configured by machine-readable instructions to:

execute an instance of the online game, and use the instance to generate state information that is transmitted over a network to client computing platforms associated with the users, wherein transmission of the state information over the network facilitates presentation of views of the online game to the users on the client computing platforms, wherein the users include a first user and a second user;

monitor the users' usage of the online game;

determine a first user type for the first user based on a first set of user gameplay information and determine a second user type for the second user based on a second set of user gameplay information, wherein the first user type is different than the second user type, wherein both the first user type and the second user type are selected from a set of user types, wherein the first set of user gameplay information is related to monitored usage of the online game by the first user and based on in-game actions performed most frequently by the first user, and wherein the second set of user gameplay information is related to monitored usage of the online game by the second user; and provide offers to purchase, by the users in the online game, item bundles comprising one or more virtual items that are usable in the online game, wherein the offers include a first offer provided to the first user and a second offer provided to the second user, wherein the first offer includes a first set of virtual items that are associated with one or more user types that are different than the determined first user type, and wherein the second offer includes a second set of virtual items that are associated with one or more user types that are different than the determined second user type.

2. The system of claim 1, wherein the one or more processors are further configured by machine-readable instructions to:

facilitate a first purchase by the first user of the first offer; and facilitate a second purchase by the second user of the second offer.

3. The system of claim 1, wherein the users' usage of the online game includes in-game actions performed by the first user in the online game.

4. The system of claim 1, wherein the first set of user gameplay information comprises online game usage information associated with other users that are associated with the first user.

5. The system of claim 1, wherein the first set of user gameplay information comprises at least one of (i) the first user's usage of other online games and (ii) other users' usage of the online game, wherein the other users are associated with the first user.

6. The system of claim 1, wherein the first set of user gameplay information comprises in-game action types performed most frequently by the first user within the instance of the online game.

7. The system of claim 1, wherein providing the first offer includes determining a first purchase price of the first offer, and wherein the first purchase price is determined such that the first set of virtual items are offered at a reduced cost.

8. The system of claim 1, wherein facilitating presentation of the online game to users includes facilitating presentation of the online game through graphical devices associated with the users and wherein providing the offers to the users comprises at least one of:

offering to re-order a previously purchased offer for a set of virtual items, offering to fill open slots in a pre-formed item bundle with one or more virtual items, and creating a new item bundle by selecting all items included therein and presenting the new item bundle to the first user on the graphical device associated with the first user.

9. The system of claim 1, wherein at least one of the first user type and/or the second user type are selected from:

i) a collection and harvesting type preferring at least one of resource collection, resource cultivation and resource manufacturing, ii) a player competition type, preferring competing with other users within the online game, and iii) a player versus environment type preferring completing quests.

10. A computer-implemented method for offering item bundles for purchase to users of an online game, wherein the offered item bundles are customized to encourage one or more types of usage of the online game by the users, the method being implemented in a computer system that includes one or more physical processors configured by machine-readable instructions, the method comprising:

executing, by the one or more physical processors, an instance of the online game, and using the instance to generate state information that is transmitted over a network to client computing platforms associated with the users, wherein transmission of the state information over the network facilitates presentation of views of the online game to the users on the client computing platforms, wherein the users include a first user and a second user;

monitoring the users' usage of the online game;

determining, by the one or more physical processors, a first user type for the first user based on a first set of user gameplay information and determining a second user type for the second user based on a second set of user gameplay information, wherein the first user type is different than the second user type, wherein both the first user type and the second user type are selected from a set of user types, wherein the first set of user gameplay information is related to monitored usage of the online game by the first user and based on in-game actions performed most frequently by the first user, and wherein the second set of user gameplay information is related to monitored usage of the online game by the second user; and providing, by the one or more physical processors, offers to purchase item bundles comprising one or more virtual items that are usable in the online game, wherein the offers include a first offer provided to the first user and a second offer provided to the second user, wherein the first offer includes a first set of virtual items that are associated with one or more user types that are different than the determined first user type, and wherein the second offer includes a second set of virtual items that are associated with one or more user types that are different than the determined second user type.

11. The method of claim 10, further comprising:

facilitating a first purchase by the first user of the first offer; and facilitating a second purchase by the second user of the second offer.

12. The method of claim 10, wherein the first set of user gameplay information comprises online game usage information associated with other users that are associated with the first user.

13. The method of claim 10, wherein the first set of user gameplay information comprises at least one of (i) the first user's usage of other online games and (ii) other users' usage of the online game, wherein the other users are associated with the first user.

14. The method of claim 10, wherein the first set of user gameplay information comprises in-game action types performed most frequently by the first user within the instance of the online game.

15. The method of claim 10, wherein providing the first offer includes determining a first purchase price of the first offer, and wherein the first purchase price is determined such that the first set of virtual items are offered at a reduced cost.

16. The method of claim 10, wherein facilitating presentation of the online game to users includes facilitating presentation of the online game through graphical devices associated with the users and wherein providing the offers to the users comprises at least one of:

offering to re-order a previously purchased offer for a set of virtual items, offering to fill open slots in a pre-formed item bundle with one or more virtual items, and creating a new item bundle by selecting all items included therein and presenting to the first user on the graphical device associated with the first user.

17. The method of claim 10, wherein at least one of the first user type and/or the second user type are selected from:
   i) a collection and harvesting type preferring at least one of resource collection, resource cultivation and resource manufacturing,
   ii) a player competition type, preferring competing with other users within the online game, and
   iii) a player versus environment type preferring completing quests.

\* \* \* \* \*